(12) United States Patent
Kim et al.

(10) Patent No.: US 9,728,754 B2
(45) Date of Patent: Aug. 8, 2017

(54) THIN FILM BATTERY MODULE, THIN FILM BATTERY PACKAGE, THIN FILM BATTERY PACKAGE MANUFACTURING DEVICE, AND THIN FILM BATTERY PACKAGE MANUFACTURING METHOD

(71) Applicant: APPLIED MATERIALS, INC., Santa Clara, CA (US)

(72) Inventors: Yong Yeon Kim, Gwangmyeong-si (KR); San Moo Kwon, Hanam-si (KR); Soo Tae Choi, Incheon (KR); Eun Hang Cho, Seoul (KR); Eun Jong Hwang, Bucheon-si (KR); Sung Gyu Bang, Seoul (KR)

(73) Assignee: Applied Materials, Inc., Santa Clara, CA (US)

( * ) Notice: Subject to any disclaimer, the term of this patent is extended or adjusted under 35 U.S.C. 154(b) by 32 days.

(21) Appl. No.: 14/366,911

(22) PCT Filed: Nov. 2, 2012

(86) PCT No.: PCT/KR2012/009206
§ 371 (c)(1),
(2) Date: Jun. 19, 2014

(87) PCT Pub. No.: WO2013/094873
PCT Pub. Date: Jun. 27, 2013

(65) Prior Publication Data
US 2014/0370364 A1    Dec. 18, 2014

(30) Foreign Application Priority Data

Dec. 19, 2011 (KR) .................. 10-2011-0137067

(51) Int. Cl.
*H01M 2/34* (2006.01)
*H01M 2/10* (2006.01)
*H01M 10/04* (2006.01)

(52) U.S. Cl.
CPC ....... *H01M 2/1022* (2013.01); *H01M 2/1061* (2013.01); *H01M 2/1094* (2013.01);
(Continued)

(58) Field of Classification Search
None
See application file for complete search history.

(56) References Cited

U.S. PATENT DOCUMENTS

2003/0064284 A1* 4/2003 Yoshida ............... H01M 2/021
429/162
2006/0057460 A1* 3/2006 Matthias ............... H01M 2/105
429/175
(Continued)

FOREIGN PATENT DOCUMENTS

CN    1405918 A    3/2003
CN    101908640 A    12/2010
(Continued)

OTHER PUBLICATIONS

Tanaka et al. JP 2006049289 A machine translation (Feb. 2006).*
(Continued)

*Primary Examiner* — Sarah A Slifka
*Assistant Examiner* — Wojciech Haske
(74) *Attorney, Agent, or Firm* — Pillsbury Winthrop Shaw Pittman LLP

(57) ABSTRACT

Provided is a thin film battery module. The thin film battery module comprises: a battery module which is configured of unit cells stacked against each other; and a shock absorbing portion which surrounds the space between the unit cells and the battery module. Also provided are a thin film battery (Continued)

package, a thin film battery package manufacturing device, and a thin film battery package manufacturing method.

18 Claims, 10 Drawing Sheets

(52) U.S. Cl.
CPC ........... *H01M 2/347* (2013.01); *H01M 10/04* (2013.01); *Y10T 29/53135* (2015.01)

(56) References Cited

U.S. PATENT DOCUMENTS

| | | | |
|---|---|---|---|
| 2007/0259258 | A1 | 11/2007 | Buck |
| 2009/0004557 | A1* | 1/2009 | Lasarov ............. B29C 45/1671 429/122 |
| 2009/0098416 | A1* | 4/2009 | Hatta .................... H01M 2/021 429/7 |
| 2010/0310911 | A1 | 12/2010 | Yamamoto et al. |

FOREIGN PATENT DOCUMENTS

| | | | |
|---|---|---|---|
| CN | 201931454 | U | 8/2011 |
| JP | 2001307704 | A | 11/2001 |
| JP | 2001-357882 | A | 12/2001 |
| JP | 2002231297 | A | 8/2002 |
| JP | 2006049289 | A * | 2/2006 |
| JP | 2007-299680 | A | 11/2007 |
| JP | 4067338 | B2 | 3/2008 |
| JP | 2009-266740 | A | 11/2009 |
| JP | 2010118159 | A | 5/2010 |
| JP | 4489374 | B2 | 6/2010 |
| JP | 2010282795 | A | 12/2010 |
| JP | 5028812 | B2 | 9/2012 |
| KR | 10-0535739 | B1 | 12/2005 |
| KR | 10-2008-0058968 | A | 6/2008 |
| KR | 10-2008-0112653 | A | 12/2008 |
| WO | 0072398 | A1 | 11/2000 |

OTHER PUBLICATIONS

European extended search report dated May 7, 2015 from EPO in connection with the counterpart European Patent Application No. 12859847.1.
Japanese Office Action dated Jun. 16, 2015.
International Search Report mailed Feb. 26, 2013 for PCT/KR2012/009206.
Written Opinion for PCT/KR2012/009206 dated Feb. 27, 2013.
Chinese Office Action dated Oct. 9, 2015 in connection with the counterpart Chinese Patent Application No. 201280063125.8.

* cited by examiner

THIN FILM BATTERY MODULE, THIN FILM BATTERY PACKAGE, THIN FILM BATTERY PACKAGE MANUFACTURING DEVICE, AND THIN FILM BATTERY PACKAGE MANUFACTURING METHOD

CROSS REFERENCE TO RELATED APPLICATION

This application claims the priority of Korean Patent Application No. 10-2011-0137067, filed on Dec. 19, 2011 in the Korean Patent and Trademark Office. Further, this application is the National Phase application of International Application No. PCT/KR2012/009206 filed on Nov. 2, 2012, which is incorporated herein by reference in its entirety.

TECHNICAL FIELD

The present invention relates to an apparatus for manufacturing a thin film battery package and, more particularly, to a thin film battery module having impact resistance, a thin film battery package, and an apparatus and method for manufacturing a thin film battery package.

BACKGROUND ART

Recently, with rapid development of techniques relating to miniaturization of electric devices and elements, a thin film battery has attracted attention for use as a micro-power source for operating these devices and elements.

A thin film battery is a battery formed by stacking components including a cathode, an anode and electrolytes in the form of thin films to have a total thickness of several dozens of micrometers.

The thin film battery has a package housing.

The package housing has a lamination space therein. Unit cells are laminated in multiple layers inside the lamination space. The unit cells are laminated to form a battery module.

The battery module has spaces at opposite sides thereof in the lamination space. In addition, a space is defined between an upper surface of the battery module and a cover placed on an upper side of the package housing.

The battery module defining such separation spaces or alignment of the unit cells is likely to be displaced by external impact.

In addition, the battery module defining such separation spaces is likely to be damaged by external impact.

As a prior document relating to the present invention, Korean Patent No. 10-0535739 (issue date: Dec. 9, 2005) discloses a technology of molding a protective circuit with a single package.

DISCLOSURE

Technical Problem

It is an aspect of the present invention to provide a thin film battery module, which has impact resistance to protect unit cells stacked inside a package housing from external impact, a thin film battery package, and an apparatus and method for manufacturing a thin film battery package.

It is another aspect of the present invention to provide a thin film battery module, which has an impact absorption layer formed of a filling material and surrounding the unit cells to have impact resistance, a thin film battery package, and an apparatus and method for manufacturing a thin film battery package.

It is a further aspect of the present invention to provide a thin film battery module, which includes an impact absorption layer surrounding the unit cells to allow multistage impact absorption, a thin film battery package, and an apparatus and method for manufacturing a thin film battery package.

Technical Solution

In accordance with embodiments of the present invention, a thin film battery module includes: a battery module formed by stacking unit cells one above another; and an impact absorption portion surrounding the battery module and a space between the unit cells and the battery module.

In accordance with embodiments of the present invention, a thin film battery package includes: a package housing having a battery module in which unit cells are stacked one above another; and an impact absorption portion filling the package housing and surrounding the battery module.

In accordance with embodiments of the present invention, an apparatus for manufacturing a thin film battery package includes: a seating part on which a package housing receiving a battery module therein is seated, the seating part being open at an upper side thereof; and a filling unit supplying a filling material in response to an electrical signal from outside to fill the package housing with the filling material such that the filling material surrounds the battery module.

In accordance with embodiments of the present invention, a method for manufacturing a thin film battery package includes: a first step of preparing a package housing open at an upper side thereof and having a battery module disposed therein; and a second step of filling the package housing with a filling material such that the filling material surrounds the battery module.

Advantageous Effects

The present invention provides an effect of protecting unit cells stacked inside a package housing from external impact.

In addition, the present invention provides an effect of imparting impact resistance to a thin film battery module by forming an impact absorption layer using a filling material to surround the unit cells.

Further, the present invention provides an effect of allowing the impact absorption layer surrounding the unit cells to perform multi-stage impact absorption.

Furthermore, the present invention provides an effect of relieving impact between the unit cells and impact applied to the battery module by supplying a filling material in a liquid or solid phase into a space between the unit cells for molding of the battery module.

BEST MODE

Hereinafter, a thin film battery module, a thin film battery package, and an apparatus and method for manufacturing a thin film battery package according to exemplary embodiments of the present invention will be described in detail with reference to the accompanying drawings.

Figure 1:
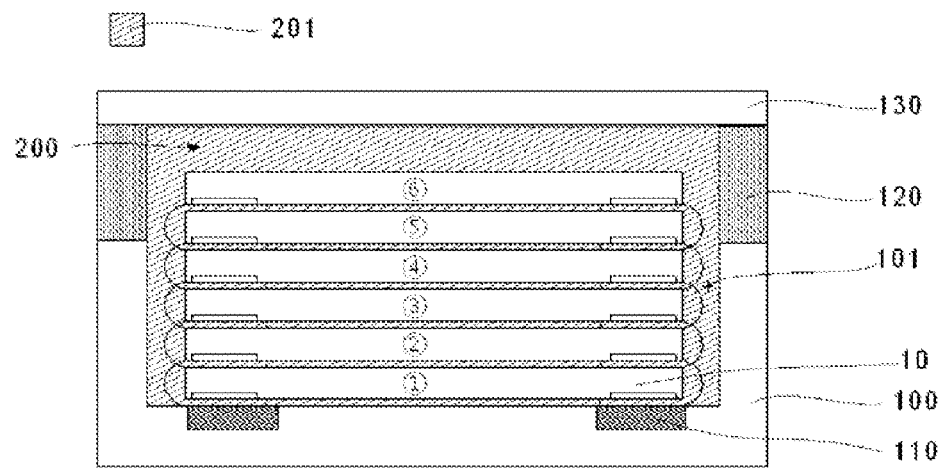
FIG. 1 is a sectional view of a thin film battery package in accordance with one embodiment of the present invention.

FIG. 1 is a sectional view of a thin film battery package according to one embodiment of the present invention.

Referring to FIG. 1, the thin film battery package according to this embodiment includes a package housing 100 and an impact absorption portion 200.

The package housing 100 is open at an upper side thereof and defines a lamination space 101 therein.

The lamination space 101 receives a battery module 10 therein. The battery module 10 is composed of unit cells stacked in multiple layers.

The unit cells are electrically connected to each other and include a lower unit cell electrically connected to an electrode 110 placed on a bottom surface of the lamination space.

The battery module 10 has a side surface separated a predetermined distance from an inner wall of the lamination space 101.

Further, an upper surface of the battery module 10 is separated from an upper end of the package housing 100 by a certain height.

Here, the upper end of the package housing 100 corresponds to a region on which a cover 130 is placed. The cover is welded to the upper end of the package housing 100.

Here, a portion of the upper end of the package housing welded to the cover 130 substantially corresponds to an upper end of a partition wall 120 formed of Kovar alloy. Hereinafter, the welded portion will be considered to be integrated with the package housing 100.

The package housing 100 may be formed of a ceramic material.

The cover 130 serves to seal the lamination space 101 from external environments.

The impact absorption portion 200 is formed by filling the lamination space 101 with a filling material 201.

The filling material 201 may be at least one of a silicon-based elastic epoxy resin or an epoxy resin having viscosity.

The filling material may have a viscosity of 400 cps or less. When the viscosity of the filling material 201 is less than or equal to 400 cps, the filling material 201 has flowability and can flow in the direction of gravity.

Figure 4:
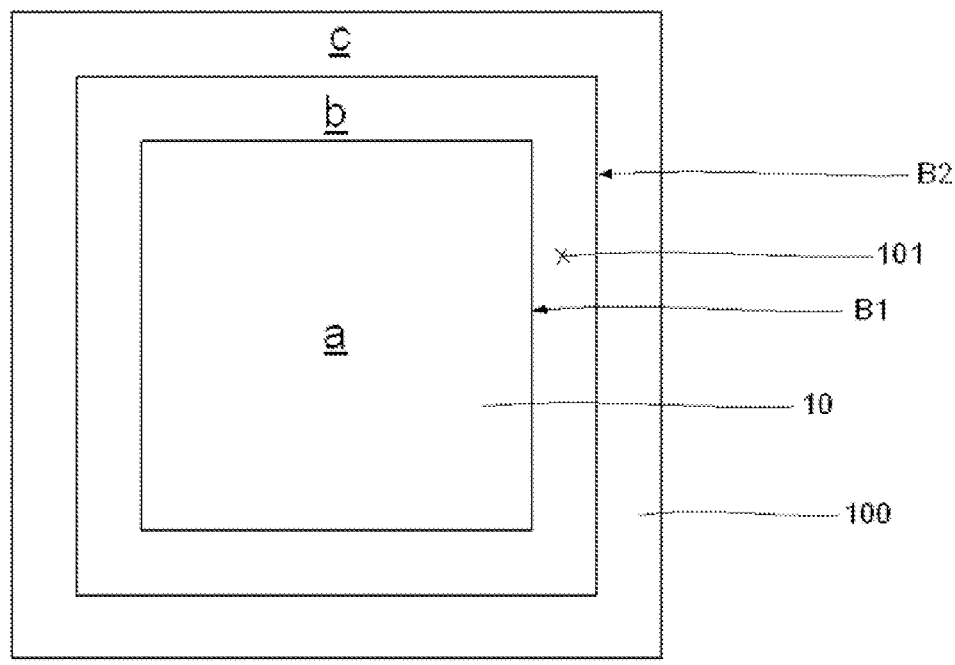
FIG. 4 is a plan view of one example of filling regions set in a battery module.

Here, as shown in FIG. 4, the battery module 10 has a first region (a) formed on the upper surface thereof. A second region (b) is formed between the circumference of the battery module 10 and the inner wall of the lamination space 101.

The filling material 201 fills the first region (a) and the second region (b). Symbol c indicates the upper end of the package housing.

The filling material 201 surrounds the circumference of the battery module 10.

That is, the impact absorption portion 200 serves to relieve external impact applied to the battery module 10.

The thin film battery package according to the present invention can efficiently prevent damage to the unit cells stacked one above another by relieving external impact.

Figure 2:
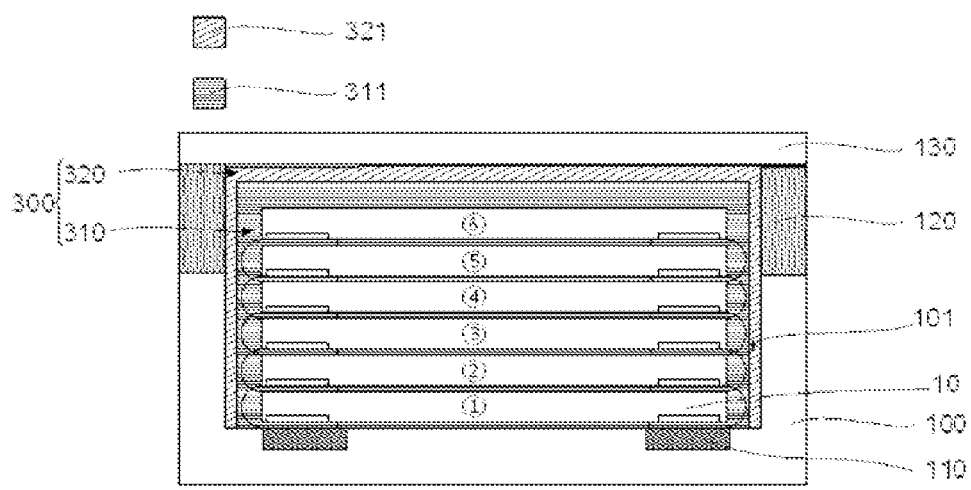
FIG. 2 is a sectional view of a thin film battery package in accordance with another embodiment of the present invention.

FIG. 2 is a sectional view of a thin film battery package in accordance with another embodiment of the present invention.

Referring to FIG. 2, in this embodiment, an impact absorption portion 300 may be composed of first and second impact absorption regions 310, 320.

The first impact absorption region 310 is formed to a predetermined thickness to surround the circumference of the battery module 10.

The first impact absorption region 310 is formed by filling with a solid-phase filling material 311.

Here, the first impact absorption region 310 may be formed by filling with a liquid-phase filling material having viscosity, followed by curing the liquid-phase filling material at a predetermined temperature.

The cured filling material has a hardness from 500 gf to 1500 gf, or from 1500 gf to 4000 gf.

In the hardness range from 500 gf to 1500 gf, the filling material is soft to absorb a certain degree of impact, and in the hardness range from 1500 gf to 4000 gf, the filling material becomes rigid to move.

The first impact absorption region 310 formed of the solid-phase filling material 311 can prevent distortion of the unit cells inside the battery module 10.

The second impact absorption region 320 is formed by filling with a liquid-phase filling material 321.

The second impact absorption region 320 is formed to a predetermined thickness to surround the circumference of the first impact absorption region 310.

The liquid-phase filling material 321 may be an epoxy resin having viscosity. The filling material may have a viscosity of 400 cP or less.

When the filling material 321 has a viscosity of 400 cP or less, the filling material 321 has flowability and can flow in the direction of gravity.

The second impact absorption region 320 is formed between the circumference of the first impact absorption region 310 and the inner wall of the lamination space 101.

Thus, the impact absorption portion 300 provides a region composed multiple layers on the circumference of the battery module 10 and capable of absorbing impact in multiple stages.

In this embodiment, when applied to the package housing, impact can be absorbed or relieved in multiple stages by the first and second impact absorption regions.

In addition, the battery module 10 can be prevented from suffering from displacement or the like by the first impact absorption region 310.

Next, an apparatus for manufacturing a thin film battery package according to the present invention will be described.

Figure 3:
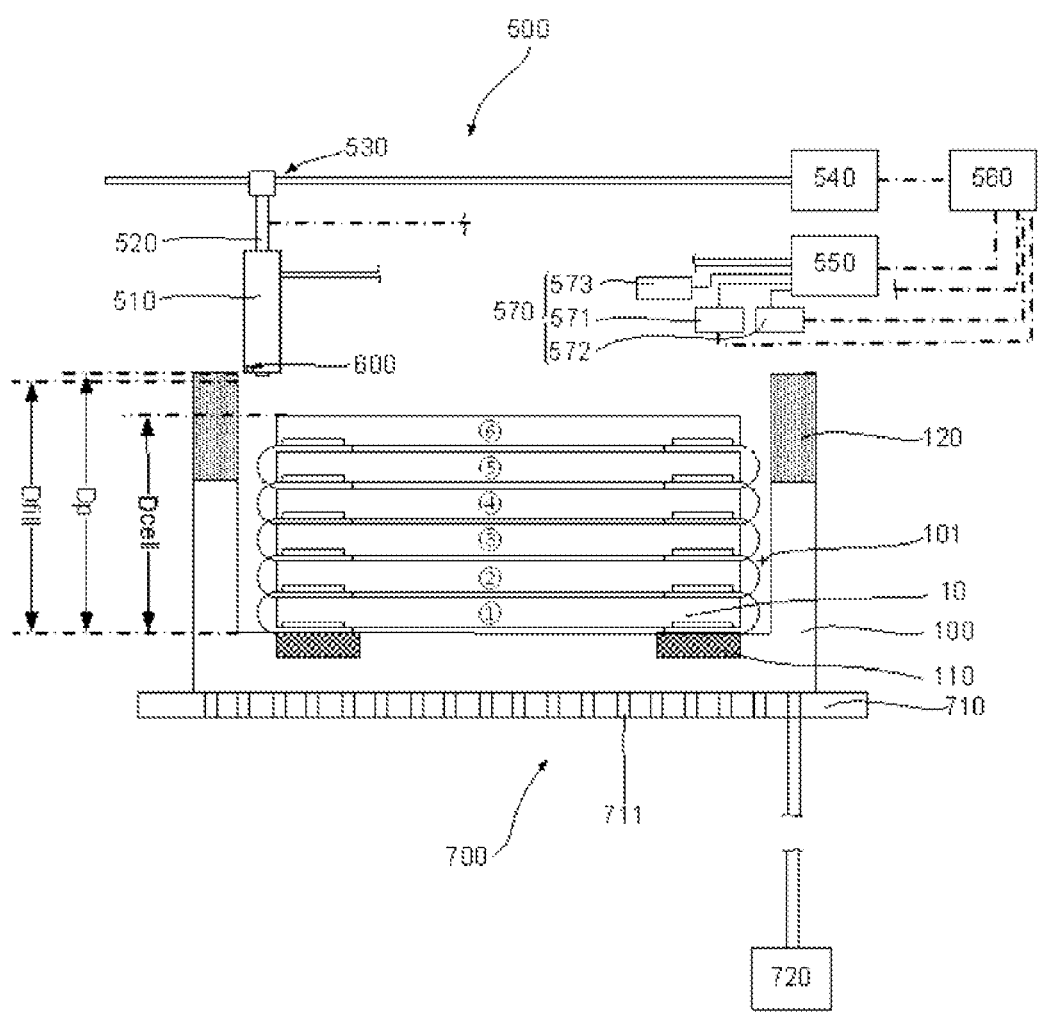
FIG. 3 is a view of an apparatus for manufacturing a thin film battery package according to the present invention.

FIG. 3 shows an apparatus for manufacturing a thin film battery package according to the present invention.

Referring to FIG. 3, the apparatus for manufacturing a thin film battery package includes a seating part 700 and a filling unit 500.

The seating part 700 includes a seating stage 710 and a vacuum providing unit 720.

The seating stage 710 provides a region on which the package housing 100 will be seated.

The seating stage 710 is formed with a plurality of vacuum holes 711.

The plural vacuum holes 711 are connected to the vacuum providing unit 720 via a tube or the like.

The vacuum providing unit 720 provides a certain degree of vacuum suction force to the plurality of vacuum holes 711 in response to an electrical signal from outside.

The plural vacuum holes 711 are exposed to a lower surface of the package housing 100 seated on the seating stage 710.

When vacuum suction force is applied to the plurality of vacuum holes 711, the package housing 100 is secured to an upper surface of the seating stage 710 by vacuum suctioning.

As a result, the package housing 100 can be stably seated on the seating stage 710.

The filling unit 500 includes a filling material ejector 510, a filling region setting part (not shown), and a controller 560.

Figure 6:
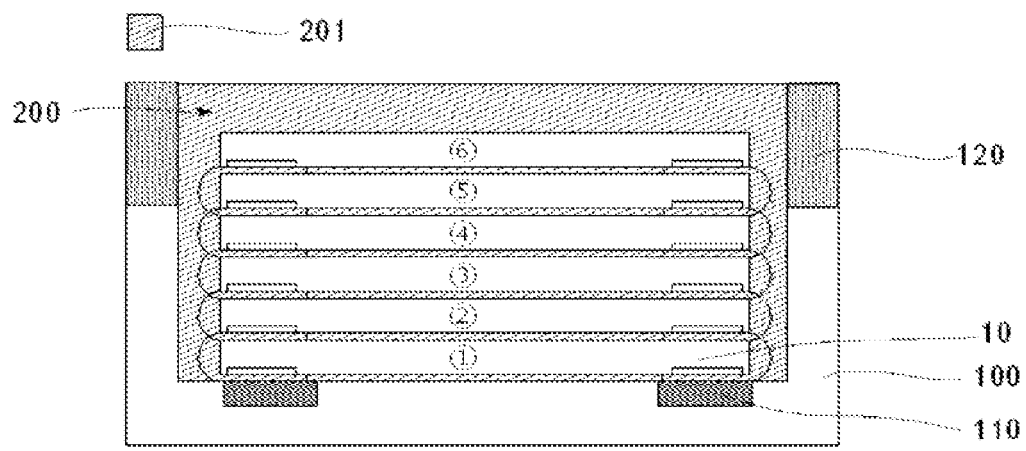
FIG. 6 is a sectional view of the package housing after filling with the filling material.

The filling material ejector 510 is a device for ejecting a liquid-phase filling material 201 (see FIG. 6).

The filling material ejector 510 includes a filling material supply 550 for supplying the liquid-phase filling material 201.

The filling material ejector 510 is disposed above the seating stage 710.

An XY gantry 530 is disposed above the seating stage 710. The filling material ejector 510 is connected to the XY gantry 530.

The XY gantry 530 is connected to a drive unit 540. The drive unit 540 may move the filling material ejector 510 to a certain XY coordinate location in response to an electrical signal from the controller 560.

In addition, a Z-axis elevator 520 is disposed between the XY gantry 530 and the filling material ejector 510.

The Z-axis elevator 520 may act like a cylinder elevating the filling material ejector 510 in response to an electrical signal from the controller 560.

With this structure, the controller 560 can move the filling material ejector 510 to a certain XYZ location using the drive unit 540 and the Z-axis elevator 520.

The filling region setting part (not shown) serves to set a region to which the filling material 201 will be ejected.

FIG. 4 shows one example of filling regions set in the battery module.

Referring to FIG. 4, the filling regions includes a first region (a) formed on the upper surface of the battery module 10 and a second region (b) formed between the circumference of the battery module 10 and the inner wall of the lamination space 101.

The first region (a) and the second region (b) may have the same filling thickness.

The filling region setting part may employ a system of coordinates.

The system of coordinates may be placed above the battery module 10. Based on the system of coordinates, coordinates defining the circumference of the battery module 10 are measured and connected to each other. As a result, a first 1 boundary B1 is defined.

Based on the system of coordinates, an inner region of the first boundary B1 is set as the first region (a).

Based on the system of coordinates, coordinates defining the inner wall of the lamination space 101 are measured and connected to each other. As a result, a second boundary B2 is defined.

Based on the system of coordinates, a region between the first boundary B1 and the second boundary B2 is set as the second region (b).

Each of the first region (a) and the second region (b) is filled with the filling material to a predetermined thickness.

Symbol c indicates a region at the upper end of the package housing.

Referring to FIGS. 3 and 4, the controller 560 controls operation of the filling material ejector 510 such that the first and second regions (a, b) are filled with a predetermined amount of the liquid-phase filling material.

Here, the filling material 201 may be an epoxy resin having viscosity. The filling material 201 may have a viscosity of 400 cps or less.

When the filling material 201 has a viscosity of 400 cps or less, the filling material 201 has flowability and can flow in the direction of gravity.

Referring to FIG. 3, the filling unit 500 according to the present invention further includes a viscosity imparting part 570 electrically connected to the controller 560.

The viscosity imparting part 570 includes a viscosity measurement instrument 571, a temperature sensor 572, and a heater 573.

The viscosity measurement instrument 571 measures viscosity of the filling material 201. The viscosity measurement instrument 571 sends the measured viscosity to the controller 560.

The controller 560 determines whether the measured viscosity is within a preset viscosity range. The preset viscosity range may be 400 cps or less.

The controller 560 stores a preset temperature for achieving the preset viscosity range.

The temperature sensor 572 measures the temperature of the liquid-phase filling material 201. The temperature sensor 572 sends the measured temperature to the controller 560.

The heater 573 heats the filling material 201 in response to an electrical signal from the controller 560. The heater 573 may include a heating coil.

Thus, the controller 560 controls the heater 573 to heat the filling material 201 to the temperature at which the filling material 201 has a viscosity of 400 cps or less.

The filling unit 500 is provided with a filling depth setting part (not shown).

Referring to FIG. 3, the filling depth setting part includes a distance sensor 600 and a setting device (not shown).

The distance sensor 600 may be provided to the filling material ejector 510.

The distance sensor 600 measures a depth Dp of the lamination space and a depth Dcell from the bottom surface of the lamination space 101 to the upper surface of the battery module 10, and sends the measured values to the setting device.

The setting device determines a distance between the depth Dcell from the bottom surface of the lamination space 101 to the upper surface of the battery module 10 and the depth Dp of the lamination space 101 as an upper limit of a filling depth.

Thus, the filling depth Dfill refers to a distance from the bottom surface of the lamination space 101 to the upper limit.

Particularly, it is desirable that the upper limit of the filling depth Dfill be coplanar with or lower than the upper end of the package housing 100.

The setting device sends the preset filling depth Dfill to the controller 560.

The controller 560 controls the filling material ejector 510 such that the filling material is supplied to the preset filling depth Dfill.

Next, operation of the apparatus having the aforementioned configuration will be described.

Referring to FIGS. 3 and 4, the package housing 100 is seated on the upper surface of the seating stage 710.

The vacuum providing unit 720 receives an electrical signal sent from the controller 560 and supplies vacuum suction force to the vacuum holes 711 formed on the seating stage 710.

The package housing 100 is attached to the upper surface of the seating stage 710 via vacuum suctioning.

As a result, the package housing 100 is stably seated on the upper surface of the seating stage 710.

The filling region setting part sets regions to be filled with the filling material 201.

Referring to FIG. 4, as described above, based on the system of coordinates, the filling region setting part sets, as the filling regions, the first region (a) defined on the upper surface of the battery module 10 and the second region (b) defined between the circumference of the battery module 10 and the inner wall of the lamination space 101.

The filling region setting part sends information about the set filling regions to the controller 560.

The filling depth setting part sets a filling depth Dfill to be filled with the filling material 201.

Referring to FIG. 3, as described above, the filling depth setting part sets a distance between the depth Dcell from the bottom surface of the lamination space 101 to the upper surface of the battery module 10 and the depth Dp of the lamination space 101 as the filling depth Dfill.

The filling depth setting part sends information about the set filling depth Dfill to the controller 560.

The filling depth setting part determines an upper limit of the filling material 201. It is desirable that the upper limit of the filling material 201 be coplanar with or lower than the upper end of the package housing 100.

Figure 7:
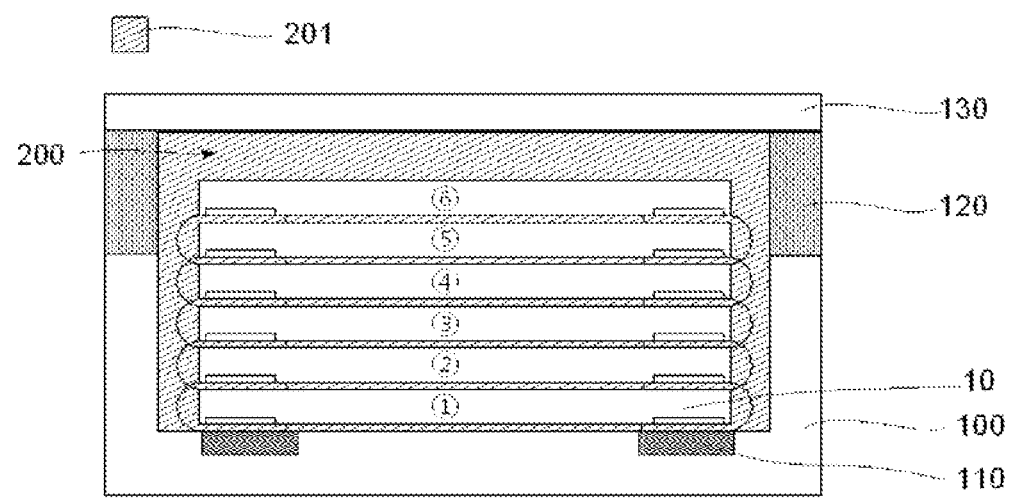
FIG. 7 is a sectional view of the package housing coupled to a cover.

That is, the upper end of the package housing 100 is a region which is brought into contact with and welded to the cover 130 (see FIG. 7). It is desirable that the welding region not contain foreign matter such as the filling material 201 at the upper end of the package housing 100.

The viscosity imparting part 570 imparts viscosity to the filling material 201 to be within a preset viscosity range.

The viscosity measurement instrument 571 measures the viscosity of the filling material 201 and sends the measured viscosity to the controller 560.

The controller 560 determines whether the viscosity of the filling material falls within the preset viscosity range. The viscosity range is set to a viscosity of 400 cps or less.

When the measured viscosity is 400 cps or more, the controller 560 controls the heater 573 to heat the filling material 201 to a temperature at which the filling material has a viscosity of 400 cps or less.

As a result, the filling material 201 can be maintained at a viscosity of 400 cps or less.

In addition, the filling material ejector 510 is moved to a location for ejecting the filling material.

Figure 5:
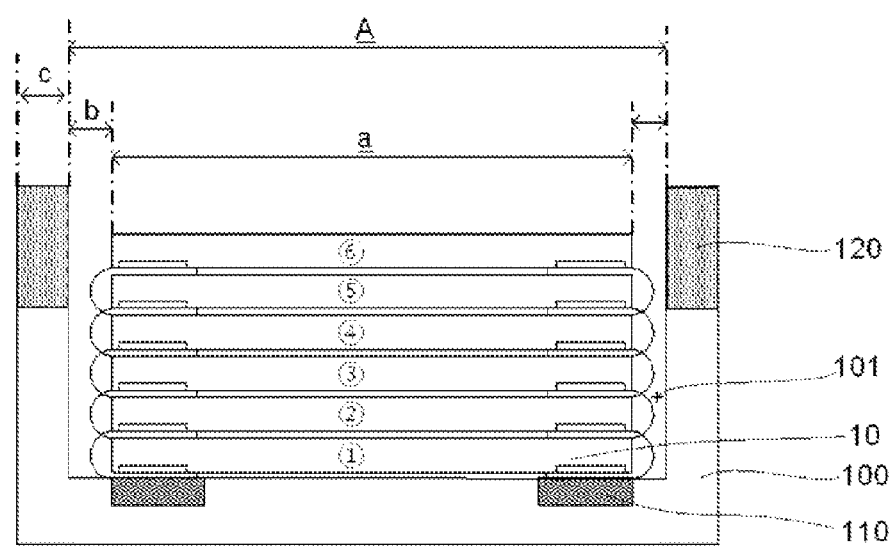
FIG. 5 is a sectional view of a package housing before filling with a filling material.

FIG. 5 shows the package housing before filling with the filling material.

Hereinafter, descriptions of the other components will refer to FIG. 3.

Referring to FIG. 5, the controller 560 controls the drive unit 540 and the Z-axis elevator 520 to place the filling material ejector 510 above a filling region A.

FIG. 6 shows the package housing after filling with the filling material.

Referring to FIG. 6, the controller 560 allows the filling region A to be filled with the liquid-phase filling material 201 to the aforementioned filling depth Dfill.

Accordingly, the battery module 10 can be surrounded by the filling material 201 inside the package housing 100.

FIG. 7 shows the package housing coupled to the cover.

Referring to FIG. 7, the cover 130 is placed on the upper end of the package housing 100. The cover 130 is welded to the upper end of the package housing 100.

According to the embodiment of the invention, the unit cells stacked inside the package housing can be protected from external impact.

In this embodiment, an impact absorption layer is formed around the unit cells using the filling material, thereby imparting impact resistance to the package housing.

In this embodiment, the filling material is supplied to spaces between the unit cells for molding of the battery module, thereby relieving impact between the unit cells and to the battery module.

Next, another example of the filling material ejector according to the present invention will be described.

Figure 8:
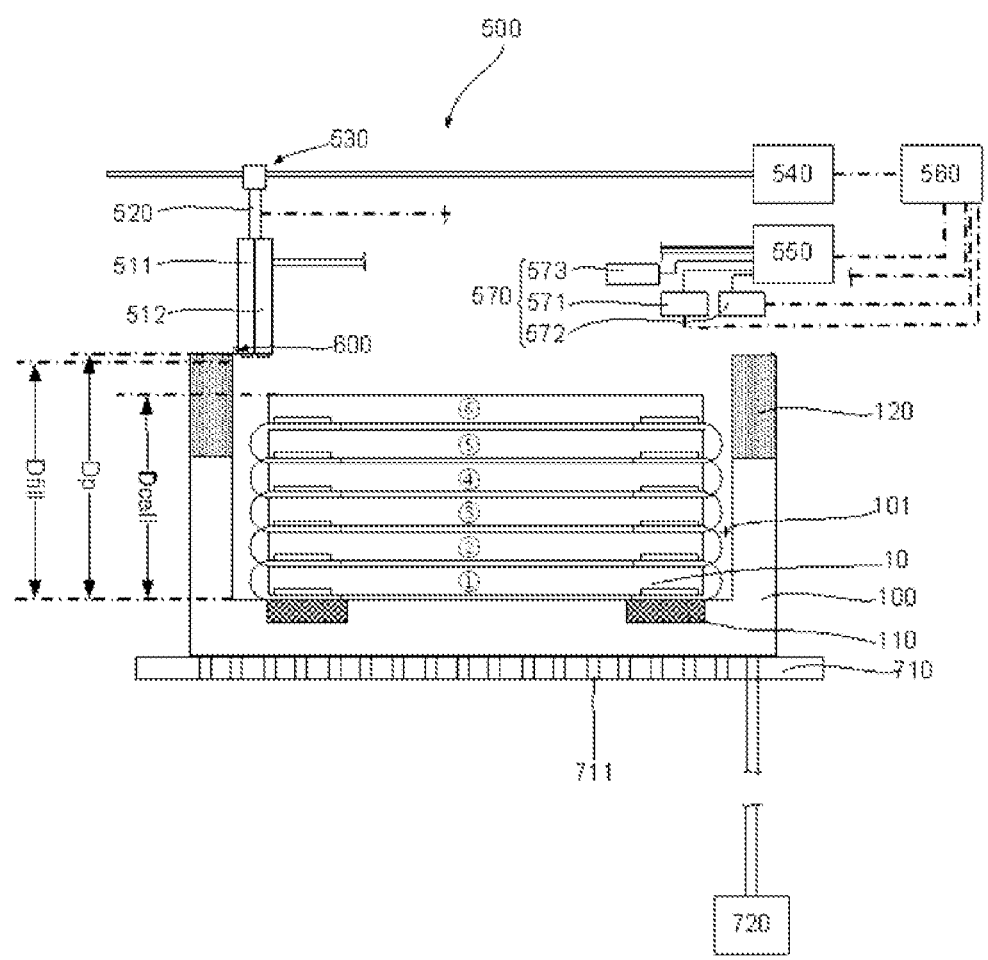
FIG. 8 is a view of the apparatus for manufacturing a thin film battery package according to the present invention, which employs another example of a filling material ejector.

FIG. 8 shows another example of the filling material ejector according to the present invention.

Referring to FIG. 8, a filling material ejector 510 according to the present invention includes a liquid-phase filling material ejector 511 and a solid-phase filling material ejector 512.

Figure 11:
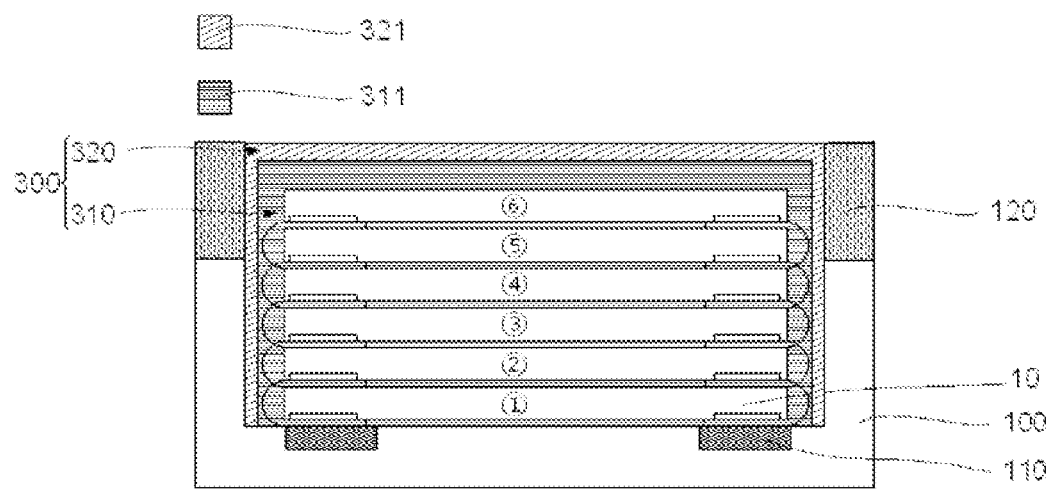
FIG. 11 is a sectional view of the package housing after filling with the filling material.

The liquid-phase filling material ejector 511 ejects a liquid-phase filling material 321 (see FIG. 11).

The liquid-phase filling material 321 may be an epoxy resin having a viscosity of 400 cps.

The solid-phase filling material ejector 512 ejects a solid-phase filling material 311.

The solid-phase filling material 311 may be a material capable of being cured immediately after ejection.

The solid-phase filling material 311 has a hardness from 500 gf to 1500 gf or a hardness from 1500 gf to 4000 gf.

In the hardness range from 500 gf to 1500 gf, the filling material is soft to absorb a certain degree of impact, and in the hardness range from 1500 gf to 4000 gf, the filling material becomes rigid to move.

Figure 9:
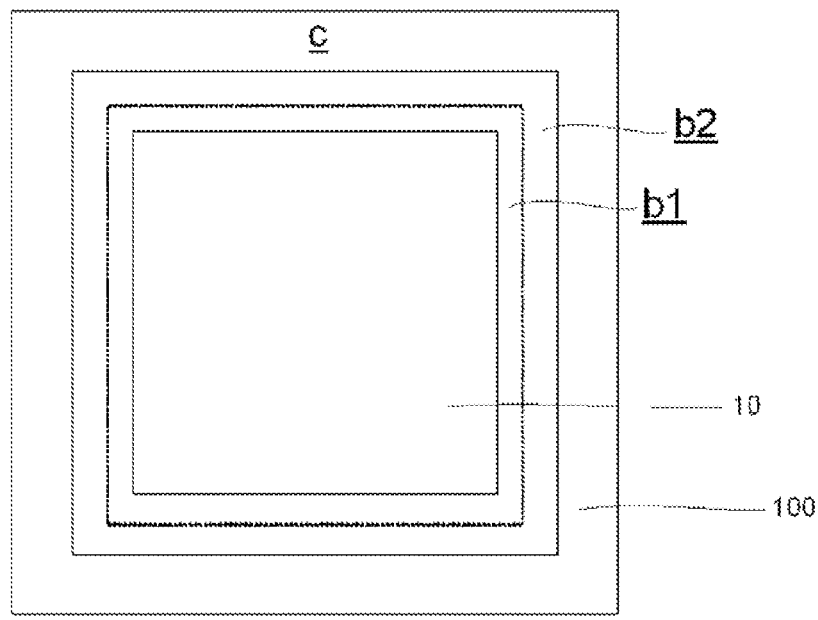
FIG. 9 is a plan view of another example of filling regions set in a battery module.

FIG. 9 shows another example of filling regions set in a battery module.

Referring to FIG. 9, the filling region setting part (not shown) according to the present invention sets a first filling region b1 and a second filling region b2.

The first filling region b1 is formed to surround an upper circumferential surface of the battery module 10 and the circumference of the battery module 10.

The second filling region b2 is formed to surround the first filling region b1. That is, the second filling region b2 is formed between the circumference of the first filling region b1 and the inner wall of the lamination space 101.

Thus, a boundary is defined between the first filling region b1 and the second filling region b2.

Next, operation of the manufacturing apparatus employing the aforementioned filling material ejector will be described.

Figure 10:
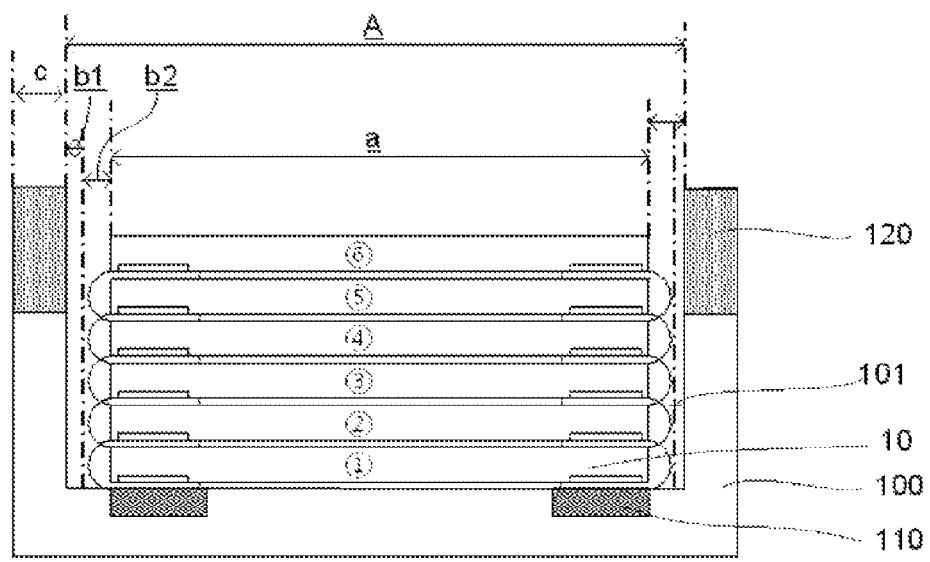
FIG. 10 is a sectional view of the package housing before filling with the filling material.

FIG. 10 shows the package housing before the package housing is filled with the filling material and FIG. 11 shows the package housing after the package housing is filled with the filling material.

Hereinafter, descriptions of the configuration of the manufacturing apparatus will refer to FIG. 8.

Referring to FIGS. 10 and 11, the controller 560 controls the drive unit 540 and the Z-axis elevator 520 to place the solid-phase filling material ejector 512 above the first filling region b1.

The solid-phase filling material ejector 512 ejects the solid-phase filling material 311 to the first filling region b1 in response to an electrical signal from the controller 560.

As a result, the first filling region b1 is filled with the solid-phase filling material 311. The solid-phase filling material 311 is cured after a predetermined period of time from ejection.

Specifically, the solid-phase filling material 311 is formed by ejecting a liquid material through the solid-phase filling material ejector 512 and curing the liquid material by heating to a predetermined temperature.

The solid-phase filling material 311 has a hardness from 500 gf to 1500 gf or a hardness from 1500 gf to 4000 gf.

In the hardness range from 500 gf to 1500 gf, the filling material is soft to absorb a certain degree of impact, and in the hardness range from 1500 gf to 4000 gf, the filling material becomes rigid to move.

As a result, the first impact absorption region 310 having a predetermined thickness is formed to surround the upper circumferential surface of the battery module 10 and the circumference of the battery module 10.

The first impact absorption region 310 has a solid phase and serves to hold the battery module 10 while surrounding the circumference of the battery module 10.

Then, the liquid-phase filling material ejector 511 ejects the liquid-phase filling material 321 to the second filling region b2 in response to an electrical signal from the controller 560.

Thus, the second filling region b2 is filled with the liquid-phase filling material 321.

As a result, the second impact absorption region 320 having a predetermined thickness is formed around the first filling region b1.

The second impact absorption region 320 has a liquid phase and serves to protect the battery module 10 surrounded by the first impact absorption region 310 from external impact.

Here, the first impact absorption region 310 and the second impact absorption region 320 are formed to the impact depth Dfill set as described above.

Figure 12:
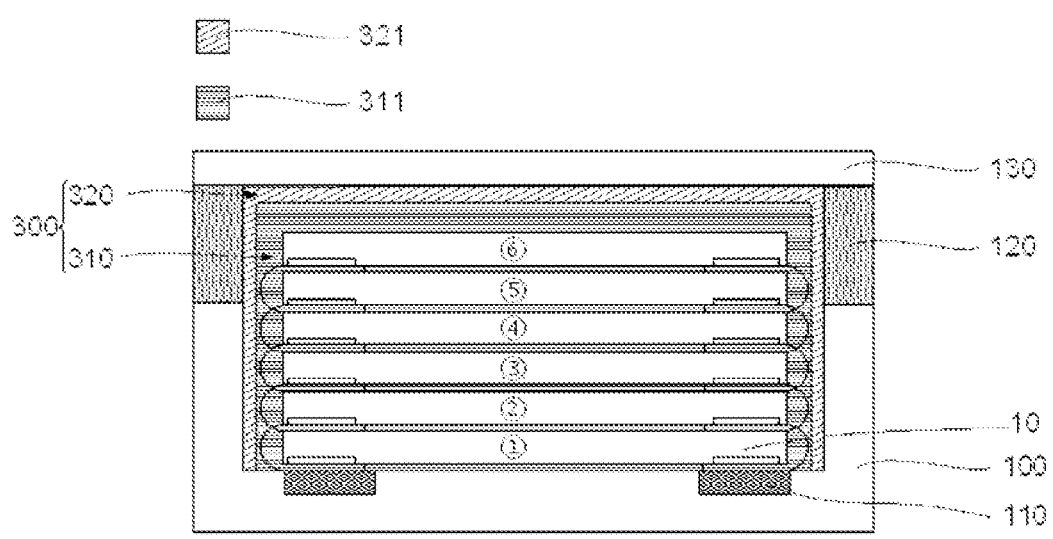
FIG. 12 is a sectional view of the package housing coupled to a cover.

FIG. 12 shows the package housing coupled to a cover.

Referring to FIG. 12, the cover 130 is placed on the upper end of the package housing 100. The cover 130 is welded to the upper end of the package housing 100.

In this embodiment, the impact absorption layer surrounding the unit cells may be formed to absorb impact through multistage absorption.

In this embodiment, the filling material is supplied to spaces between the unit cells for molding of the battery module, thereby relieving impact between the unit cells and to the battery module.

Next, a method for manufacturing a thin film battery package according to the present invention will be described.

Figure 13:
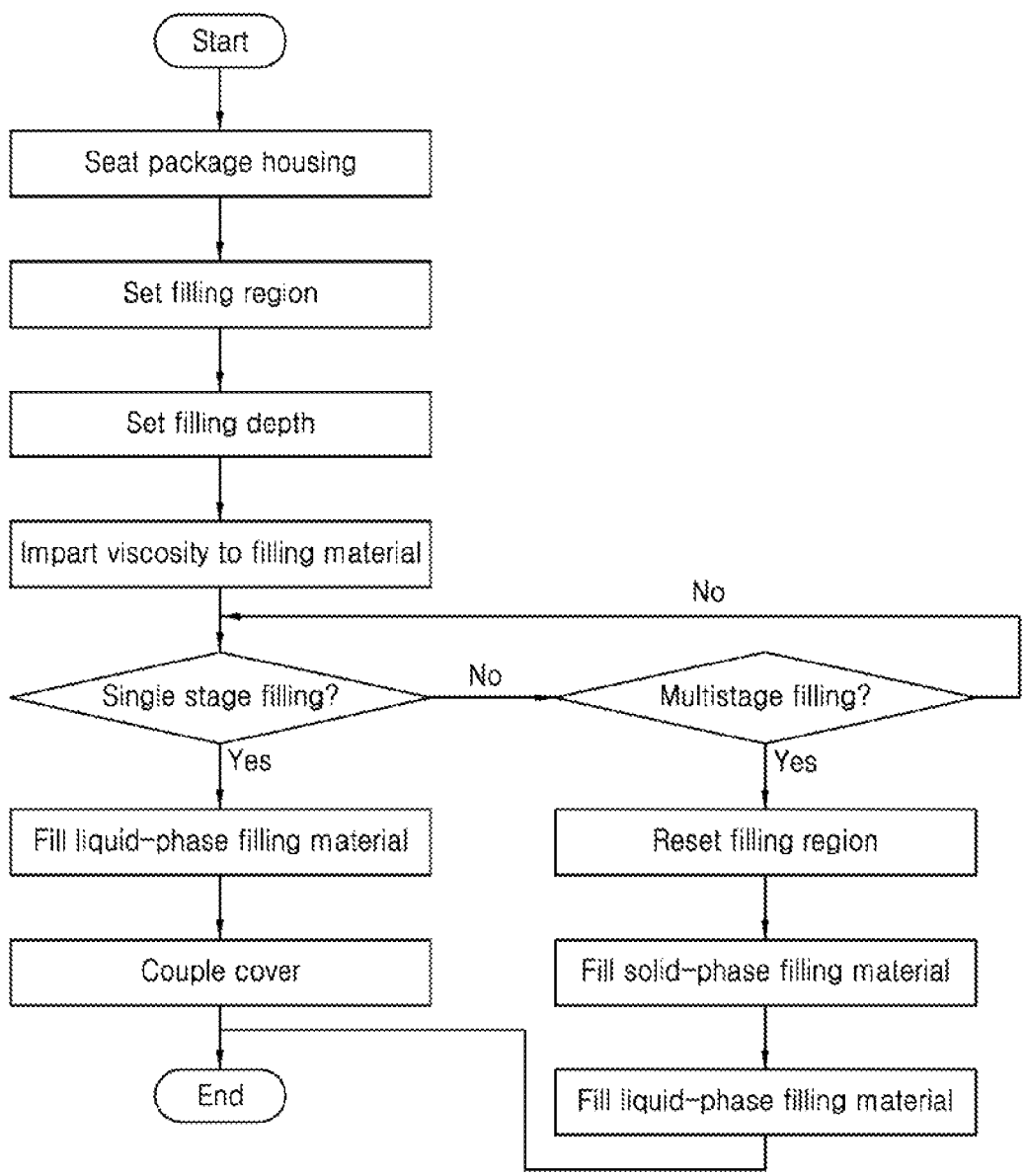
FIG. 13 is a flowchart of a method for manufacturing a thin film battery package according to the present invention.

FIG. 13 is a flowchart of a method for manufacturing a thin film battery package according to the present invention.

In the following description, the configuration of the manufacturing apparatus will refer to FIG. 3 to FIG. 7.

First Step

Referring to FIG. 13, the package housing 100 is placed on the seating stage 710. The package housing 100 is open at an upper side thereof and defines the lamination space 101 therein.

The lamination space 101 receives the battery module 10 including the unit cells stacked one above another in multiple stages.

The package housing 100 may be secured to the seating stage 710 via vacuum suctioning using the vacuum providing unit 720.

Second Step

The package housing is filled with a filling material such that the filling material surrounds the battery module 10.

The second step will be described in more detail.

Filling regions are formed.

Formation of the filling regions may be carried out using the aforementioned filling region setting part.

A first region (a) is formed on an upper surface of the battery module 10, and a second region (b) is formed in a space between the circumference of the battery module 10 and the inner wall of the lamination space 101.

A filling depth (Dfill) is formed.

The filling depth Dfill may be formed using the aforementioned filling depth setting part.

Here, a distance between the depth Dcell from the bottom surface of the lamination space 101 to the upper surface of the battery module 10 and the depth Dp of the lamination space 101 is determined as an upper limit of the filling depth Dfill.

Thus, the filling depth Dfill refers to a distance from the bottom surface of the lamination space 101 to the upper limit.

Particularly, it is desirable that the upper limit of the filling depth Dfill be coplanar with or lower than the upper end of the package housing 100.

Viscosity is imparted to the filling material.

Here, the filling material may be a liquid-phase filling material 201.

The filling material 201 may be an epoxy resin having a viscosity of 400 cps or less.

Figure 14:
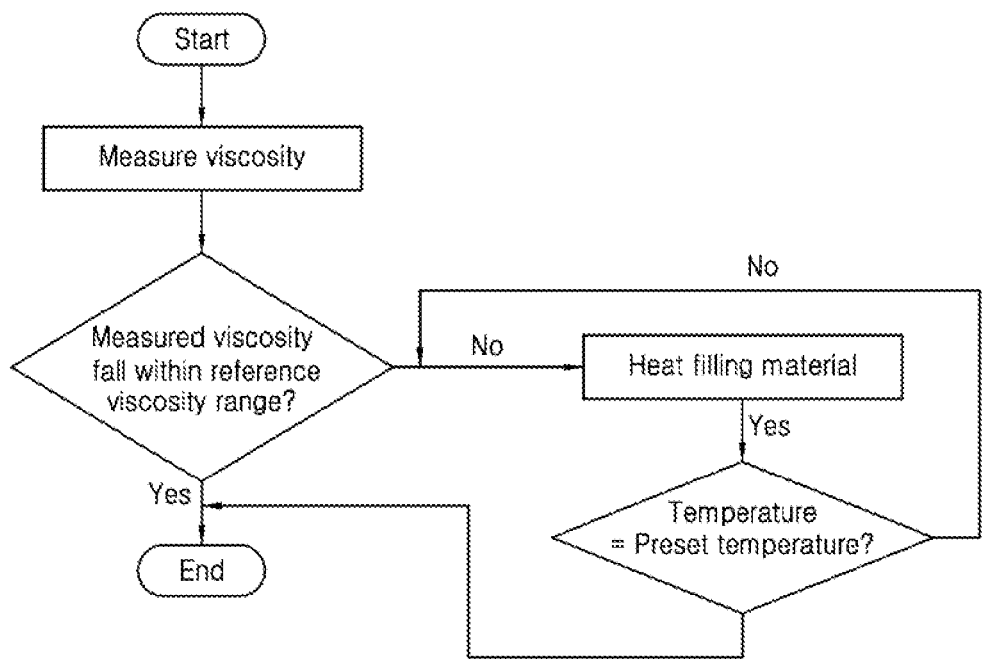
FIG. 14 is a flowchart of a process of imparting viscosity according to the present invention.

FIG. 14 shows a process of imparting viscosity.

Referring to FIG. 14, the viscosity measurement instrument 571 measures the viscosity of the filling material 201.

The viscosity measurement instrument 571 sends the measured viscosity to the setting device.

The setting device determines whether the measured viscosity falls within a preset reference viscosity range.

When the measured viscosity falls within the preset reference viscosity range, the setting device finishes the process of imparting viscosity.

When the measured viscosity does not fall within the preset reference viscosity range, the setting device heats the filling material 201 using the heater 573.

Here, during heating of the filling material, the temperature sensor 572 measures the temperature of the filling material 201 and sends the measured temperature to the setting device.

The setting device heats the filling material 201 to a preset reference temperature.

Herein, the reference temperature refers to a temperature at which the filling material 201 has a viscosity within the reference viscosity range.

Then, the setting device finishes the process of imparting viscosity.

Referring to FIG. 13, the controller 560 selects single-stage filling or multi-stage filling, after the process of imparting viscosity to the filling material 201 is finished as described above.

First, the case of selecting single-stage filling will be described.

The controller controls the filling material ejector 510 to fill the filling regions including the first and second regions (a, b) with the filling material 201.

Here, the first region (a) and the second region (b) are filled with the filling material 201 to a predetermined thickness, thereby forming the impact absorption portion 200.

Then, the cover 130 is welded to the upper end of the package housing 100.

According to the embodiment of the invention, the unit cells stacked inside the package housing can be protected from external impact.

In this embodiment, an impact absorption layer is formed around the unit cells using the filling material, thereby imparting impact resistance to the package housing.

Next, the case of selecting multi-stage filling will be described.

In the following description, the configuration of the manufacturing apparatus will refer to FIG. 8 to FIG. 12.

The filling region setting part may reset the filling regions.

That is, the filling region setting part sets first and second filling regions b1, b2, as shown in FIG. 10.

The first and second filling regions b1, b2 are formed to a predetermined thickness around the circumference of the battery module 10 and a boundary is formed therebetween.

That is, the filling region is formed in multiple layers.

The controller 560 controls the solid-phase filling material ejector 512 to fill the first filling region b1 with a solid-phase filling material 311.

The solid-phase filling material 311 is cured after a predetermined period of time from ejection.

Specifically, the first filling region b1 is filled with a liquid filling material having a predetermined viscosity, followed by curing the filling material at a predetermined temperature.

The solid-phase filling material has a hardness from 500 gf to 1500 gf or a hardness from 1500 gf to 4000 gf.

In the hardness range from 500 gf to 1500 gf, the filling material is soft to absorb a certain degree of impact, and in the hardness range from 1500 gf to 4000 gf, the filling material becomes rigid to move.

As a result, a first impact absorption region 310 is formed to a certain thickness on the upper surface of the battery module 10 and around the circumference of the battery module 10.

Then, the controller 560 controls the liquid-phase filling material ejector 511 to fill the second filling region b2 with the liquid-phase filling material 321.

The liquid-phase filling material 321 is placed between the circumference of the first filling region b1 and the inner wall of the lamination space 101.

As a result, a second impact absorption region 320 is formed in the second filling region b2.

Then, the cover 130 is welded to the upper end of the package housing 100.

In the embodiment of the present invention, when impact is applied to the package housing, the package housing relieves the impact through the first and second impact absorption regions by multistage absorption or relief.

According to the embodiment of the invention, displacement of the battery module can be prevented by the first impact absorption region formed in a solid state.

Figure 15:
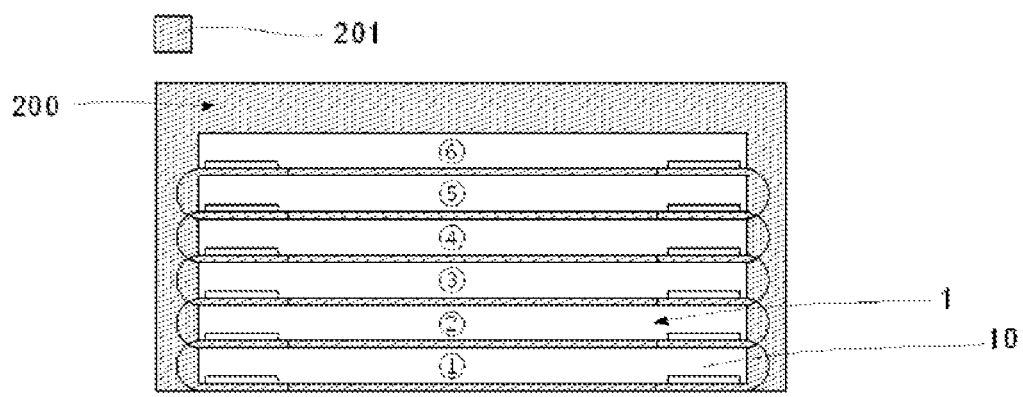
FIG. 15 is a sectional view of a thin film battery module according to one embodiment of the present invention.

FIG. 15 is a sectional view of a thin film battery module according to one embodiment of the present invention.

Referring to FIG. 15, the thin film battery module according to this embodiment includes a battery module 10 and an impact absorption portion 200.

The battery module 10 is provided with a plurality of unit cells 1 stacked one above another in a vertical direction.

Here, a space is formed between the unit cells 1.

The impact absorption portion 200 surrounds the battery module 10 and the space between the unit cells 1.

The impact absorption portion 200 may be formed of at least one of a silicon-based elastic epoxy resin or an epoxy resin having viscosity.

The epoxy resin may have a viscosity of 400 cps (centipoise) or less.

In this embodiment, the epoxy resin is provided as the liquid-phase filling material 201 and is supplied into the space between the unit cells 1 while surrounding the battery module 10.

As a result, according to this embodiment, when impact is applied to the battery module, the thin film battery module can relieve impact between the unit cells and impact applied to the battery module itself.

Figure 16:
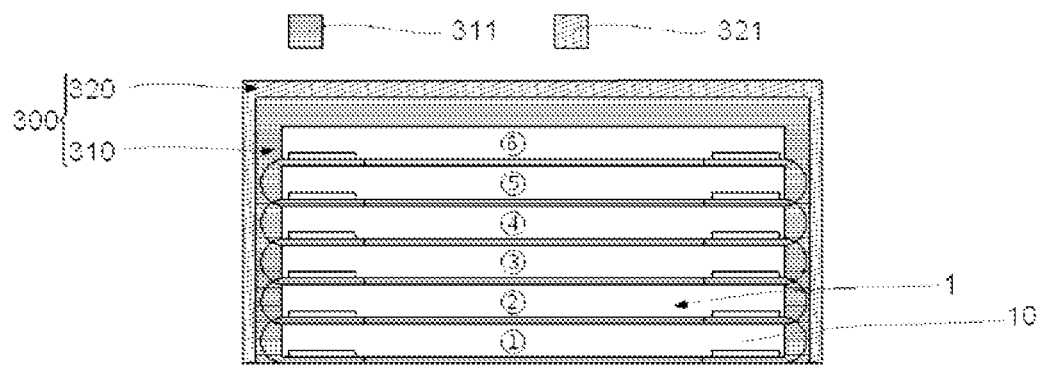
FIG. 16 is a sectional view of a thin film battery module according to another embodiment of the present invention.

FIG. 16 is a sectional view of a thin film battery module according to another embodiment of the present invention.

An impact absorption portion 300 includes impact absorption regions formed on the circumference of the battery module 10 and having different material phases such that a boundary is defined between the impact absorption regions.

The impact absorption regions may include a first impact absorption region 310 and a second impact absorption region 320.

The first impact absorption region 310 is formed to a certain thickness to surround the circumference of the battery module 10 and has a solid phase.

The second impact absorption region 320 surrounds the first impact absorption region 310 and is formed of an epoxy resin having viscosity.

The first impact absorption region 310 is formed by curing a liquid material having viscosity at a predetermined temperature.

The cured material has a hardness from 500 gf to 1500 gf, or from 1500 gf to 4000 gf.

In the hardness range from 500 gf to 1500 gf, the filling material is soft to absorb a certain degree of impact, and in the hardness range from 1500 gf to 4000 gf, the filling material becomes rigid to move.

Here, when the filling material has a liquid phase, the filling material is supplied into the space between the unit cells 1 and is cured at a predetermined temperature.

In this embodiment, the liquid-phase filling material 312 and the solid-phase filling material 311 are supplied to surround the battery module while infiltrating the space between the unit cells.

As a result, according to this embodiment, when impact is applied to the battery module, the battery module can relieve impact between the unit cells and impact applied to the battery module itself.

The invention claimed is:

1. A thin film battery package comprising:
   a package housing having one or more sidewalls and a bottom surface, and including electrodes formed at the bottom surface;
   a battery module being electrically connected to the electrodes, the battery module comprising unit cells, the unit cells being stacked upon one another within the package housing such that a lowermost unit cell adjoins the electrodes formed at the bottom surface of the package housing; and
   an impact absorption portion over an upper surface of a topmost unit cell and between at least the topmost unit cell and the one or more sidewalls of the package housing,
   wherein the impact absorption portion comprises:
      a first impact absorption region surrounding the circumference of the battery module and having a solid phase; and
      a second impact absorption region surrounding a circumference of the first impact absorption region and comprising an epoxy resin having viscosity;
   wherein at least two of the unit cells are spaced apart by a first gap and the first impact absorption portion is in the gap, and wherein the electrodes and the lowermost unit cell are spaced apart by a second gap and the first impact absorption portion is in the second gap.

2. The thin film battery according to claim 1, wherein the impact absorption portion comprises at least one of a silicon-based elastic epoxy resin or an epoxy resin having viscosity.

3. The thin film battery according to claim 1, wherein a boundary is defined between the first impact absorption region and the second impact absorption region.

4. The thin film battery according to claim 1, wherein the first impact absorption region comprises a partially cured liquid material, a liquid phase of the partially cured liquid material having a viscosity at a predetermined temperature such that the partially cured liquid material has a hardness capable of absorbing an external impact that falls within a range of 500 gf to 1500 gf.

5. The thin film battery according to claim 1, wherein the impact absorption portion over the upper surface of the topmost unit cell and between the topmost unit cell and the sidewalls of the package housing has a uniform thickness.

6. The thin film battery according to claim 1, wherein each of the sidewalls of the housing includes one or more partition walls on a top side of the sidewall.

7. The thin film battery according to claim 6, wherein each of the one or more partition walls comprises Kovar alloy.

8. The thin film battery according to claim 1, wherein the package material comprises a ceramic material.

9. The thin film battery according to claim 1, further comprising:
   a cover over the sidewalls; and
   one or more partition walls disposed between the cover and the package housing.

10. The thin film battery according to claim 9, wherein the cover is welded to an upper end of the package housing.

11. The thin film battery according to claim 9, wherein an inner surface of the cover facing the battery module is separated from the upper surface of the topmost unit cell.

12. The thin film battery according to claim 11, wherein at least some of the impact absorption portion is between the inner surface of the cover and the upper surface of the topmost unit cell.

13. The thin film battery according to claim 9, wherein an upper end of the package housing substantially corresponds to an upper end of each of the partition walls.

14. The thin film battery according to claim 1, wherein the first impact absorption region comprises a cured liquid material having a hardness capable of absorbing an external impact that falls within a range of 1500 gf to 4000 gf.

15. A thin film battery package comprising:
   a package housing having one or more sidewalls and a bottom surface, and including electrodes formed at the bottom surface;
   a battery being electrically connected to the electrodes, the battery comprising unit cells, the battery being within the package housing and adjoining the electrodes formed at the bottom surface of the package housing;
   an impact absorption portion at least over an upper surface of the battery; and
   a cover over the impact absorption portion;
   wherein the impact absorption portion comprises:
      a first impact absorption region surrounding the circumference of the battery and having a solid phase; and
      a second impact absorption region surrounding a circumference of the first impact absorption region and comprising an epoxy resin having viscosity;
   wherein at least two of the unit cells are spaced apart by a first gap and the first impact absorption portion is in the first gap, and wherein the electrodes and the battery are spaced apart by a second gap and the first impact absorption portion is in the second gap.

16. A thin film battery package comprising:
   a package housing having one or more sidewalls and a bottom surface, and including electrodes formed at the bottom surface;
   a battery being electrically connected to the electrodes, the battery comprising unit cells, the battery being within the package housing and adjoining the electrodes formed at the bottom surface of the package housing; and
   an impact absorption portion over an upper surface of the battery and between the battery and the one or more sidewalls of the package housing;
   wherein the impact absorption portion comprises:
      a first impact absorption region surrounding the circumference of the battery and having a solid phase; and
      a second impact absorption region surrounding a circumference of the first impact absorption region and comprising an epoxy resin having viscosity;
   wherein at least two of the unit cells are spaced apart by a first gap and the first impact absorption portion is in the first gap, and wherein the electrodes and the battery are spaced apart by a second gap and the first impact absorption portion is in the second gap.

17. The thin film battery according to claim 1, wherein the epoxy resin in the second impact absorption region is a liquid-phase filling material.

18. The thin film battery according to claim 1, wherein the epoxy resin in the second impact absorption region has a viscosity of 400 centipoise or less.

* * * * *